US012651891B2

(12) United States Patent
Blankmeister et al.

(10) Patent No.: US 12,651,891 B2
(45) Date of Patent: Jun. 9, 2026

(54) SPARK PLUG HAVING A SMALL INTER-ELECTRODE DISTANCE AND AN AT LEAST PARTLY NEGATIVE SPARK POSITION

(71) Applicant: Robert Bosch GmbH, Stuttgart (DE)

(72) Inventors: Matthias Blankmeister, Heiligenhaus (DE); Alexander Seelig, Wernau (DE); Sergej Subkow, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 273 days.

(21) Appl. No.: 18/559,764

(22) PCT Filed: Mar. 28, 2022

(86) PCT No.: PCT/EP2022/058084

§ 371 (c)(1),
(2) Date: Jan. 5, 2024

(87) PCT Pub. No.: WO2022/238038

PCT Pub. Date: Nov. 17, 2022

(65) Prior Publication Data

US 2024/0380188 A1 Nov. 14, 2024

(30) Foreign Application Priority Data

May 11, 2021 (DE) ..................... 10 2021 204 744.0

(51) Int. Cl.
*H01T 1/22* (2006.01)
*H01T 13/46* (2006.01)

(52) U.S. Cl.
CPC ............. *H01T 1/22* (2013.01); *H01T 13/467* (2013.01)

(58) Field of Classification Search
CPC ......... H01T 1/22; H01T 13/467; H01T 13/54; H01T 13/32; H01T 13/20; Y02T 10/30
See application file for complete search history.

(56) References Cited

U.S. PATENT DOCUMENTS 2,744,211 A * 5/1956 Berkman ................ H01T 13/50
123/169 PA
4,061,122 A * 12/1977 Edgar ...................... H01T 13/54
123/169 EL (Continued)

FOREIGN PATENT DOCUMENTS

DE 102004050291 A1 6/2006
DE 102017107679 A1 10/2018

(Continued)

*Primary Examiner* — Thienvu V Tran
*Assistant Examiner* — Muaamar Qahtan Al-Taweel
(74) *Attorney, Agent, or Firm* — NORTON ROSE FULBRIGHT US LLP

(57) ABSTRACT

A spark plug having a longitudinal axis. The spark plug includes: a housing having a bore along the spark plug longitudinal axis and a combustion-chamber-side end face; an insulator arranged at least partially within the housing, and having an insulator base extending from a combustion-chamber-side end face of the insulator to an insulator base neck; a central electrode arranged at least partially within the insulator; and a ground electrode arranged on the housing, the ground electrode and the central electrode being arranged so that the at least one ground electrode forms a spark gap with the central electrode, a width of the spark gap being defined by an inter-electrode distance between the central electrode and the ground electrode. The inter-electrode distance between the central electrode and the ground electrode is not greater than 0.4 mm. The spark gap is formed at least partially within the housing.

12 Claims, 2 Drawing Sheets

(56) References Cited

U.S. PATENT DOCUMENTS

| | | | | |
|---|---|---|---|---|
| 4,901,688 | A * | 2/1990 | Kashiwara | H01T 13/467 123/169 EL |
| 5,113,806 | A * | 5/1992 | Rodart | H01T 13/54 123/670 |
| 2002/0021066 | A1 * | 2/2002 | Kanao | H01T 13/467 123/169 EL |
| 2007/0069617 | A1 * | 3/2007 | Tozzi | F02B 19/12 313/140 |
| 2009/0277410 | A1 * | 11/2009 | Kameda | H01T 13/32 123/169 R |
| 2011/0065350 | A1 * | 3/2011 | Burke | H01T 13/54 219/69.11 |
| 2012/0299459 | A1 | 11/2012 | Sakakura et al. | |
| 2013/0206122 | A1 | 8/2013 | Chiera et al. | |

FOREIGN PATENT DOCUMENTS

| | | | |
|---|---|---|---|
| DE | 102018211009 | A1 | 1/2020 |
| DE | 102018214232 | A1 | 2/2020 |
| DE | 102019122976 | A1 | 2/2020 |
| DE | 102019207399 | A1 | 11/2020 |
| JP | 2002164146 | A | 6/2002 |
| JP | 2002175863 | A | 6/2002 |
| JP | 2016512914 | A | 5/2016 |
| JP | 2020184435 | A | 11/2020 |

* cited by examiner

SPARK PLUG HAVING A SMALL INTER-ELECTRODE DISTANCE AND AN AT LEAST PARTLY NEGATIVE SPARK POSITION

FIELD

The present invention relates to a spark plug. In particular, the spark plug according to the present invention is suitable for use in an engine operated with hydrogen.

BACKGROUND INFORMATION

Until now, most vehicles, such as cars or trucks, have been driven by an internal combustion engine that uses gasoline or diesel as fuel. Increasingly, there are mobile and stationary internal combustion engines that use natural gas or hydrogen as fuel. As with the gasoline-powered internal combustion engine, in the hydrogen-powered internal combustion engine the air-fuel mixture must also be externally ignited. A spark plug is typically used for this purpose.

SUMMARY

In hydrogen-powered internal combustion engines, a very lean air-fuel mixture (lambda>1.8) is usually set in order to meet the legal emission requirements. Together with the low mixture calorific value of hydrogen, this results in higher charge densities and correspondingly higher pressures at the time of ignition. Another special feature of hydrogen combustion in an internal combustion engine is the interplay between auto-ignition temperature and the minimum ignition energy required. As a result, a "cold spark plug" is required for use in a hydrogen-powered internal combustion engine, i.e., a spark plug with a very low heat value is needed. According to Bosch nomenclature, this means that the spark plug preferably has a heat value of less than or equal to 3.

Conventional spark plugs are usually optimized for operation in a gasoline-powered internal combustion engine and are therefore not suitable for use, or deliver poor performance when used, in hydrogen-powered combustion engines.

Accordingly, the problem addressed by the present invention is that of providing a spark plug which fulfills the requirements for a spark plug when used in a hydrogen-powered internal combustion engine.

SUMMARY

This problem may be solved with the spark plug according to the present invention, of the type mentioned at the outset, in that the inter-electrode distance between the central electrode and the at least one ground electrode is not greater than 0.4 mm, and in that the spark gap is formed at least partially within the housing.

A spark plug according to an example embodiment of the present invention with a longitudinal axis has a housing with a bore along this longitudinal axis, the housing having an inner side and an outer side due to the bore. The housing has a combustion-chamber-side end face. An insulator is arranged at least partially within the housing. The insulator has a bore along its longitudinal axis. At its combustion-chamber-side end, the insulator has a combustion-chamber-side end face, and an insulator base. The insulator base extends from the combustion-chamber-side end face as far as an insulator base neck. The insulator base neck forms the transition between the insulator base and an insulator seat. The insulator rests on the housing with this insulator seat. A central electrode is arranged at least partially within the insulator. The combustion-chamber-side end of the central electrode for example protrudes from the insulator. The spark plug also has at least one ground electrode which is arranged on the housing, the at least one ground electrode and the central electrode being arranged such that the at least one ground electrode forms a spark gap with the central electrode. A width of the spark gap results from an inter-electrode distance between the central electrode and the at least one ground electrode.

According to the present invention, it is provided that the spark gap has an inter-electrode distance of not greater than 0.4 mm. This has the advantage that less voltage is required for ignition and the increase in the inter-electrode distance over the life of the spark plug is smaller. Since the installation space within the housing is naturally limited, the small inter-electrode distance also advantageously provides the possibility of arranging the electrodes and thus also the spark gap at least partially within the housing. This has the advantage that the electrodes do not protrude so far into the combustion chamber and therefore absorb less heat from the combustion chamber. This has the result that the spark plug absorbs less heat overall and is a cold spark plug, so that undesired auto-ignition is avoided. This combination of the two features according to the present invention is thus particularly advantageous.

Further advantageous embodiments of the present invention are disclosed herein.

Advantageously, according to an example embodiment of the present invention, for example, the inter-electrode distance is not greater than 0.2 mm, in particular not greater than 0.15 mm.

The smaller the inter-electrode distance, the lower the voltage requirement for generating an ignition spark.

According to an example embodiment of the present invention, it is also advantageous that the inter-electrode distance is at least 0.05 mm, in particular is not less than 0.1 mm. As a result, the inter-electrode distance is not too small. A very small inter-electrode distance places particular challenges on accuracy in spark plug production. In the case of a small inter-electrode distance, a deviation from the most parallel possible alignment of the electrode ignition surfaces has a greater effect, such as uneven wear of the ignition surface, than in the case of a larger inter-electrode distance. The lower limit for the inter-electrode distance is therefore a good compromise for a small inter-electrode distance to reduce the ignition voltage requirement and wear on the one hand, and, on the other hand, a justifiable outlay for a consistently good quality of the alignment of the ignition surfaces with each other during spark plug production.

In a further advantageous embodiment of the spark plug according to the present invention, the spark gap has a distance from the combustion-chamber-side end face of the housing of at least 0 mm and at most-15 mm, in particular not less than-1 mm and/or not greater than-4 mm. Here a plane perpendicular to the longitudinal axis of the spark plug and spanned by the combustion-chamber-side end face of the housing is a reference plane with the value 0 mm. The distance from the reference plane assumes an increasingly negative value in the direction of the end of the spark plug remote from the combustion chamber and an increasingly positive value in the direction of the combustion chamber.

The spark gap is the volume between the ground electrode and the central electrode that results between the overlapping projections of the oppositely situated ignition surfaces of the electrodes. That is, the ignition surface of the central electrode is projected onto the ignition surface of the ground electrode and vice versa. The volume that both projections span is the volume of the spark gap. The volume is delimited in one dimension by the ignition surfaces and in the other dimensions by the projected overlap of the ignition surfaces. The distance is measured from the combustion-chamber-side end of the spark gap to the combustion-chamber-side end face of the housing.

The feature that the distance of the spark gap to the combustion-chamber-side end face of the housing is at least 0 mm means that the spark gap is arranged completely within the housing, i.e., the spark plug has a neutral or a negative spark position. This has the advantage that the electrodes are pulled out of the combustion chamber as far as possible and thus absorb as little heat as possible from the combustion processes taking place in the combustion chamber. This makes it possible to obtain a spark plug that is as cold as possible.

Another advantageous measure for a spark plug that is as cold as possible is to design the insulator base as short as possible. It has been found to be advantageous for the insulator base to have a length not longer than 7 mm, in particular not longer than 4 mm. Here the length of the insulator base is measured parallel to the longitudinal axis of the spark plug.

The shorter the insulator base is, the less it protrudes into the breathing chamber of the spark plug. The breathing chamber of the spark plug is filled with the gas mixture present in the combustion chamber. The less the insulator base protrudes into the breathing chamber, the less contact surface the insulator base has with the hot gas mixture and, correspondingly, the less heat it can absorb from the gas mixture.

In a further advantageous embodiment of the present invention, the central electrode protrudes from the insulator. The central electrode here has a protrusion dimension that is measured from the combustion-chamber-side end face of the insulator to a combustion-chamber-side end of the central electrode. The protrusion dimension of the central electrode is not larger than 6.0 mm, in particular not larger than 4.0 mm, and in particular not smaller than 0.5 mm, preferably not smaller than 1.1 mm.

Limiting the protrusion dimension to a maximum length of 6.0 mm has the advantage that the central electrode does not protrude too far into the breathing chamber and therefore cannot absorb as much heat from the gas mixture in the breathing chamber, so that the spark plug has a low heat value. The advantage of the minimum length of the protrusion dimension is that, at a minimum length of 0.5 mm, the distance to the combustion-chamber-side end face of the insulator is large enough to exclude creepage sparks along the insulator when the ground electrodes are set laterally radially in relation to the central electrode.

The spark plug has a breathing chamber which extends from the combustion-chamber-side end face of the housing to the insulator base neck inside the housing, the central electrode and the insulator base being arranged inside the breathing chamber and the at least one ground electrode being arranged at least partially, in particular completely, inside the breathing chamber. In particular, the breathing chamber is in contact with a combustion chamber in the plane spanned by the end face of the housing perpendicular to the longitudinal axis of the spark plug when the spark plug is installed in an internal combustion engine. Advantageously, it is provided that the breathing chamber has a volume of not greater than 500 $mm^3$, in particular not greater than 300 $mm^3$, and in particular not less than 50 $mm^3$. When calculating the volume, the volume of the electrodes and of the insulator is not included.

Limiting the volume of the breathing chamber results in the advantage that the breathing chamber is not too large and can therefore easily be flushed with a fresh gas mixture so that not too much gas mixture used up by the ignition accumulates in the breathing chamber. On the one hand, this prevents the deposition of particles produced during combustion, such as soot, and on the other hand a fresh gas mixture has a lower temperature than a used gas mixture, thus reducing the heat input into the spark plug via the breathing chamber.

In an advantageous further development of the present invention, the insulator base and/or the inner sides of the housing have a contour resulting from a rounding with a non-constant radius. The rounding preferably has two legs with different leg lengths, resulting from the projection of the rounding in a first and a second direction, the directions and thus also the leg lengths being perpendicular to one another. The flow of the gas mixture can be influenced by these roundings on the insulator base and/or on the inner side of the housing. The contour and position of the rounding is preferably selected so that the breathing chamber is well flushed between two ignition processes. Of course, it is particularly advantageous if the contours of the insulator base and the inner of the housing in the breathing chamber are matched to one another.

In an advantageous further development of the present invention, it is provided that the spark plug has at least two ground electrodes which each form a spark gap with the central electrode, the plurality of ground electrodes being arranged identically or differently in relation to the central electrode, i.e. the spark gaps can be identical or different, but preferably all spark gaps fulfill the advantageous features listed here, such as position in relation to the combustion-chamber-side end face of the housing and inter-electrode distance.

Since the spark plug has a plurality of ground electrodes, the wear of the ignition surface can be distributed over a plurality of ground electrodes, and the ignition surface of the individual ground electrode does not require as much volume of a wear-resistant material as with a single ground electrode. The service life of the spark plug is increased.

In a particularly advantageous embodiment of the present invention, the at least two ground electrodes are arranged symmetrically on the inner side of the housing. The longitudinal axis of the spark plug is the axis of symmetry in the arrangement of the ground electrodes. The symmetrical arrangement of the ground electrodes results in the technical effect that the flow of the fuel-air mixture within the breathing chamber is very uniform, which further promotes good ignition and good ignition stability of the fuel-air mixture in the spark plug.

For example, the at least one ground electrode and/or the central electrode advantageously each has an ignition surface made of a different material from the rest of the electrode, forming the spark gap with the oppositely situated electrode, and the ignition surface(s) consists of a noble metal or a noble metal alloy, in particular Pt, Ir, Rh, Pd, Re, Au, or an alloy thereof. An alloy with a high Ir content is particularly advantageous here, i.e., Ir is the element with the highest individual content in the alloy. These elements or alloys with these elements are particularly wear-resistant.

The spark plug according to the present invention and its further development is, for example, a hydrogen spark plug which is designed to be used in an engine operated with hydrogen-containing fuel and to ignite the ignitable hydrogen-containing fuel-air mixture. The fuel can contain up to 100% hydrogen, i.e. the fuel can be only hydrogen, or a hydrogen-gas mixture.

However, the spark plug according to the present invention is not limited to operation with hydrogen. The spark plug according to the present invention can also be used for natural gas or gasoline internal combustion engines.

Furthermore, the spark plug according to the present invention can also have a cap on the combustion-chamber-side end face of the housing, whereby it becomes a pre-chamber spark plug.

BRIEF DESCRIPTION OF EXAMPLE EMBODIMENTS

DETAILED DESCRIPTION OF EXAMPLE EMBODIMENTS

Figure 1:
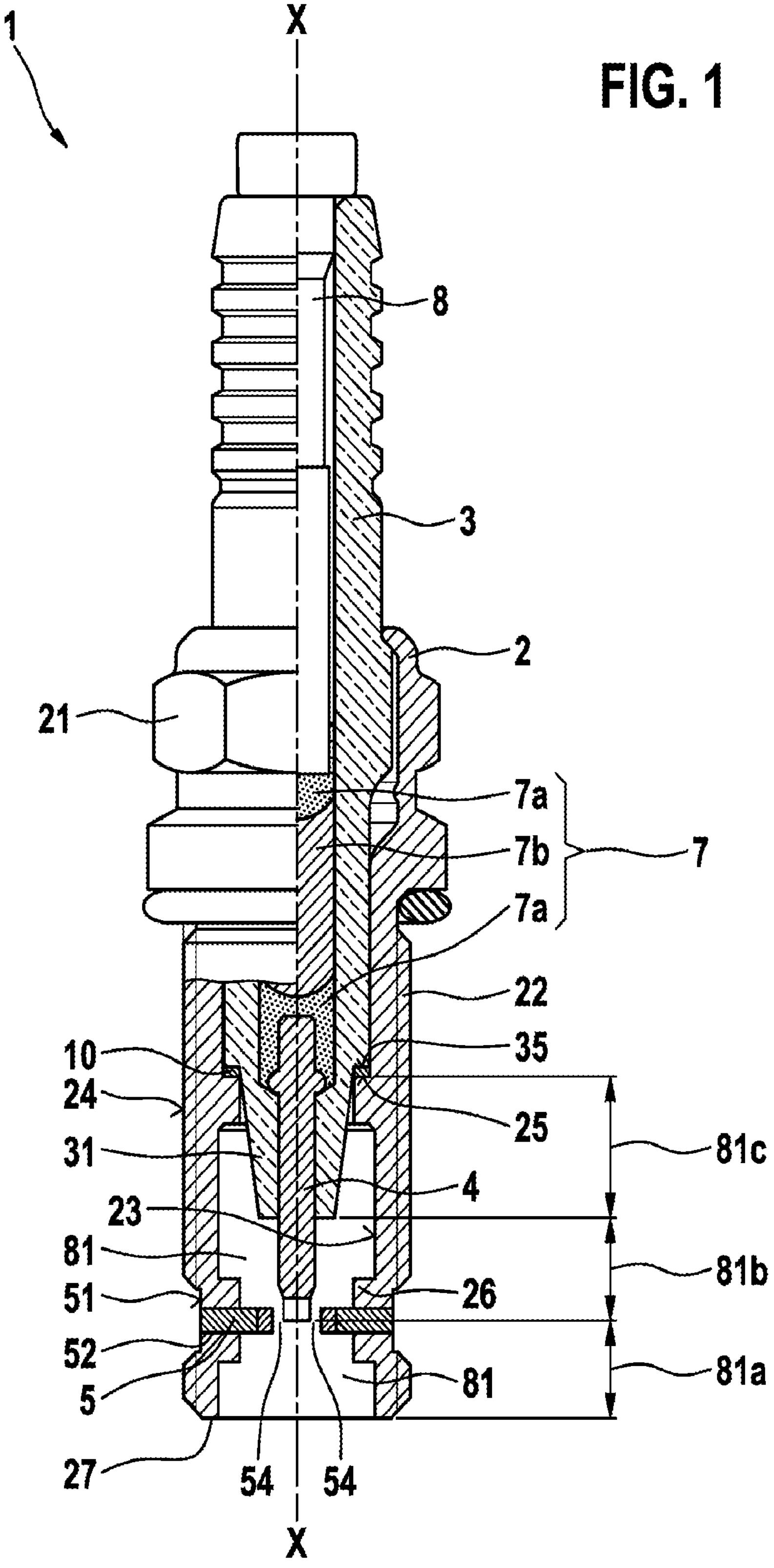
FIG. 1 shows an example of a spark plug according to the present invention.

FIG. 1 shows a half-sectional view of a spark plug 1. The spark plug 1 comprises a housing 2. An insulator 3 is inserted into the housing 2. The housing 2 and the insulator 3 each have a bore along their longitudinal axis. The housing 2 has an outer side 24 and an inner side 23. The longitudinal axis of the housing 2, the longitudinal axis of the insulator 3, and the longitudinal axis x of the spark plug 1 coincide. A central electrode 4 is inserted into the insulator 3. Furthermore, a connecting bolt 8 extends into the insulator 3 for electrical contacting of the spark plug; via this the spark plug 1 is electrically contacted to a voltage source. The electrical contacting forms the end of the spark plug 1 remote from the combustion chamber. The electrical contacting can be made in one piece, as in this example, or also from a plurality of components.

The insulator 3 is typically divided into three regions: insulator base 31, insulator body, and insulator head. The three regions differ, for example, by different diameters. The insulator base 31 is the end of the insulator 3 close to the combustion chamber. The central electrode 4 is arranged within the insulator base 31. The insulator base 31 is here arranged completely within the housing 2. As a rule, the insulator base 31 has the smallest outer diameter on the insulator 3. Here, the insulator base has a length 81*c* of at most 7 mm.

The insulator body, which is generally completely surrounded by the housing 2, is arranged adjacent to the insulator base 31. The insulator body has a greater outer diameter than the insulator base 31. The transition between the insulator base 31 and the insulator body is designed as a shoulder, the so-called insulator seat 35. The transition between the insulator seat 35 and the insulator base 31 is referred to as the insulator base neck.

The insulator head adjoins the end of the insulator body remote from the combustion chamber and forms the end of the insulator 3 remote from the combustion chamber. The insulator head protrudes from the housing 2. The outer diameter of the insulator head lies between the outer diameters of the insulator base 31 and the insulator body; the regions typically do not have a constant outer diameter over their length; rather, the outer diameter can vary.

The housing 2 also has a seat 25 on its inner side. The insulator rests with its shoulder or insulator seat 35 on the housing seat 25. An inner seal 10 is arranged between the insulator seat 35 and the housing seat 25.

A resistance element 7 is located in the insulator 3 between the central electrode 4 and the connecting bolt 8 for electrical contacting of the spark plug. The resistance element 7 connects the central electrode 4 to the connecting bolt 8 in an electrically conductive manner. The resistance element 7 is constructed, for example, as a layer system made up of a first contact layer 7*a*, a resistance layer 7*b*, and a second contact layer 7*a*. The layers of the resistance element differ in their material composition and the resulting electrical resistance. The first contact layer 7*a* and the second contact layer 7*a* can have a different or the same electrical resistance.

In this example, two ground electrodes 5 are arranged in a respective bore 52 on the inner side 23 of the housing 2, so that the ground electrodes 5 project radially from the inner side 23 of the housing into the bore along the longitudinal axis X of the housing 2. The ground electrodes 5 and the central electrode 4 together form a spark gap 54 in each case. The respective spark gap between the central electrode and the corresponding ground electrode extends radially with respect to the longitudinal axis x. The width of the corresponding spark gap 54 is the inter-electrode distance, and is in the range of from 0.05 mm to 0.4 mm. The bores 52 extend from the outer side 24 through the housing wall as far as the inner side 23 of the housing 2.

Alternatively, the two ground electrodes 5 could also be arranged on the combustion-chamber-side end face 27 of the housing 2.

Alternatively, the spark plug 1 can also have more than only one, or more than two, ground electrodes 5.

In this example according to FIG. 1, in each case there is a spark gap 54 between the central electrode 4 and the two ground electrodes 5. In this case, the projections of the respective ignition surface of the central electrode 4 and a corresponding ground electrode 5 do not completely overlap. The combustion-chamber-side end of the spark gap lies in a plane perpendicular to the longitudinal axis x with the combustion-chamber-side end face of the central electrode 4. The distance 81*a* of the spark gap to the plane spanned by the combustion-chamber-side end face 27 of the housing 2 perpendicular to the longitudinal axis x is here greater than 0 and equal to or less than-15 mm.

The central electrode 4 protrudes from the insulator base 31 and has a protrusion dimension 81*b* of at least 0.5 mm up to a maximum of 6.0 mm.

The housing 2 has a shaft. A polygon 21, a shrink-fit groove, and a thread 22 are formed on this shaft. The thread 22 is used to screw the spark plug 1 into an engine.

The bores 52 in the housing wall are formed in the region of the thread 22. The bore 52 for the ground electrodes 5, and thus also the ground electrodes 5, can be arranged at any desired height in the region of the thread 22. Depending on the position of the ground electrodes 5 in the region of the thread 22, the central electrode 4 and, with it, the insulator base 31 correspondingly protrude to a further or lesser extent into the breathing chamber 81. The position of the bores in the region of the thread 22 and of the ground electrodes 5 on the inner side 23 of the housing 2 can be selected depending on the desired use of the spark plug 1.

The bores 52 are arranged, for example, in a respective recess 51 such as a conical or a round groove. Here the outer diameter of the housing 2 in the recesses is smaller than the core diameter of the thread 22.

The recesses 51 can be created, for example, by stamping of the housing 2 during the manufacture of the spark plug 1.

This not only reduces the outer diameter of the housing 2 in the region of the recesses 51, but also the inner diameter of the housing 2 in the region of the recesses 51, so that a projection 26 is created within the housing for each recess 51.

Inside the housing 2 there is a breathing chamber 81 that has a volume. The breathing chamber 81 extends from the combustion-chamber-side end face 27 of the housing into the housing 2, and within the housing 2 as far as the insulator base neck, which adjoins the insulator seat 35 which rests on the housing seat 25. At this location, the gap between the housing 2 and the insulator 3 is sealed in a gas-tight manner by an inner seal 10. The volume of the ground electrodes 5, the central electrode 4, and the insulator base 31 is subtracted when calculating the breathing chamber volume. The volume of the breathing chamber 81 is at most 500 $mm^3$.

The housing 2 or the bores 52 for the ground electrodes 5 may have grooves or scores from the manufacturing process, resulting in a surface roughness. The grooves and scores arise, for example, when the bores on or in the housing 2 are machined by a turning process in which material is removed from the housing 2.

Figure 2:
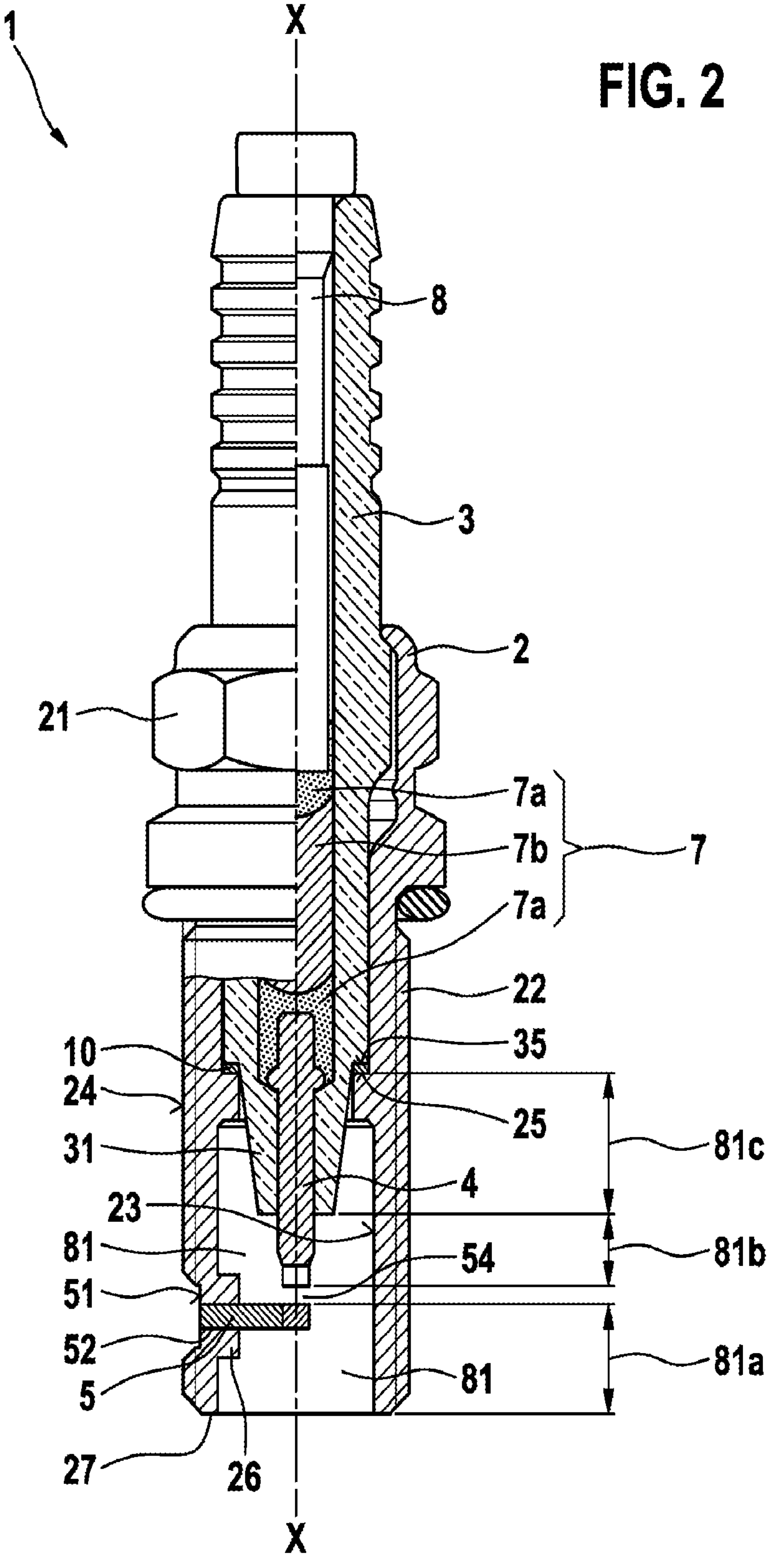
FIG. 2 shows a second example of a spark plug according to the present invention.

FIG. 2 shows a second example of the spark plug 1 according to the present invention. This example differs from the first example in the arrangement of the ground electrode 5. In this example, the ground electrode 5 is arranged as a so-called roof electrode with respect to the central electrode 4. The spark gap 54 between the central electrode 4 and the ground electrode 5 extends in parallel with the longitudinal axis x. The width of the spark gap 54 is the inter-electrode distance parallel to the longitudinal axis x and is in the range of from 0.05 mm to 0.4 mm.

The combustion-chamber-side end of the axial spark gap 54 is defined by the ignition surface of the ground electrode 5. The distance 81*a* of the spark gap 54 to the plane spanned by the combustion-chamber-side end face 27 of the housing 2 perpendicular to the longitudinal axis x is measured correspondingly.

A second ground electrode, arranged laterally to the central electrode 4 and thus forming a spark gap 54 radially to the longitudinal axis x, is not shown here, but is possible.

The invention claimed is:

1. A spark plug having a longitudinal axis, comprising:

a housing having a bore along the spark plug longitudinal axis and a combustion-chamber-side end face;

an insulator arranged at least partially within the housing, the insulator having an insulator base which extends from a combustion-chamber-side end face of the insulator to an insulator base neck;

a central electrode arranged at least partially within the insulator; and at least one ground electrode arranged on the housing, the at least one ground electrode and the central electrode being arranged in such a way that the at least one ground electrode forms a spark gap with the central electrode, a width of the spark gap being defined by an inter-electrode distance between the central electrode and the at least one ground electrode, wherein the inter-electrode distance between the central electrode and the at least one ground electrode is not greater than 0.4 mm, and the spark gap is formed at least partially within the housing, and wherein the spark gap has a distance from the combustion-chamber-side end face of the housing of greater than 0 mm and at most-15 mm, a plane perpendicular to the longitudinal axis of the spark plug spanned by the combustion-chamber-side end face of the housing being a reference plane having a value 0 mm, and a distance from the reference plane in a direction of the end of the spark plug remote from the combustion chamber assuming an increasingly negative value.

2. The spark plug according to claim 1, wherein the inter-electrode distance is not greater than 0.2 mm.

3. The spark plug according to claim 2, wherein the inter-electrode distance is not greater than 0.15 mm.

4. The spark plug according to claim 1, wherein the inter-electrode distance is at least 0.05 mm.

5. The spark plug according to claim 4, wherein the inter-electrode distance is not less than 0.1 mm.

6. A spark plug having a longitudinal axis, comprising:

a housing having a bore along the spark plug longitudinal axis and a combustion-chamber-side end face;

an insulator arranged at least partially within the housing, the insulator having an insulator base which extends from a combustion-chamber-side end face of the insulator to an insulator base neck;

a central electrode arranged at least partially within the insulator; and at least one ground electrode arranged on the housing, the at least one ground electrode and the central electrode being arranged in such a way that the at least one ground electrode forms a spark gap with the central electrode, a width of the spark gap being defined by an inter-electrode distance between the central electrode and the at least one ground electrode, wherein the inter-electrode distance between the central electrode and the at least one ground electrode is not greater than 0.4 mm, and the spark gap is formed at least partially within the housing, and wherein the insulator base has a length, measured parallel to the longitudinal axis of the spark plug, which is not longer than 7 mm.

7. A spark plug having a longitudinal axis, comprising:

a housing having a bore along the spark plug longitudinal axis and a combustion-chamber-side end face;

an insulator arranged at least partially within the housing, the insulator having an insulator base which extends from a combustion-chamber-side end face of the insulator to an insulator base neck;

a central electrode arranged at least partially within the insulator; and at least one ground electrode arranged on the housing, the at least one ground electrode and the central electrode being arranged in such a way that the at least one ground electrode forms a spark gap with the central electrode, a width of the spark gap being defined by an inter-electrode distance between the central electrode and the at least one ground electrode, wherein the inter-electrode distance between the central electrode and the at least one ground electrode is not greater than 0.4 mm, and the spark gap is formed at least partially within the housing, and wherein the central electrode protrudes from the insulator, and a protrusion dimension of the central electrode, measured from the combustion-chamber-side end face of the insulator as far as a combustion-chamber-side end of the central electrode, is not greater than 6.0 mm and is not smaller than 0.5 mm.

8. A spark plug having a longitudinal axis, comprising:

a housing having a bore along the spark plug longitudinal axis and a combustion-chamber-side end face;

an insulator arranged at least partially within the housing, the insulator having an insulator base which extends from a combustion-chamber-side end face of the insulator to an insulator base neck;

a central electrode arranged at least partially within the insulator; and at least one ground electrode arranged on the housing, the at least one ground electrode and the central electrode being arranged in such a way that the at least one ground electrode forms a spark gap with the central electrode, a width of the spark gap being defined by an inter-electrode distance between the central electrode and the at least one ground electrode, wherein the inter-electrode distance between the central electrode and the at least one ground electrode is not greater than 0.4 mm, and the spark gap is formed at least partially within the housing, and wherein the spark plug has a breathing chamber which extends within the housing from the combustion-chamber-side end face of the housing to the insulator base neck, the central electrode and the insulator base being arranged within the breathing chamber and the at least one ground electrode being arranged at least partially within the breathing chamber, and the breathing chamber has a volume of not greater than 500 $mm^3$ and not less than 50 $mm^3$.

9. The spark plug according to claim 1, wherein the insulator base and/or inner sides of the housing has a contour which results from a rounding with a non-constant radius.

10. The spark plug according to claim 1, wherein the spark plug has at least two ground electrodes which each form a spark gap with the central electrode, the ground electrodes being arranged symmetrically around the central electrode.

11. The spark plug according to claim 1, wherein the at least one ground electrode and/or the central electrode each has an ignition surface which forms the spark gap with an oppositely situated electrode, and the ignition surface includes a noble metal or a noble metal alloy, including: i) Pt, or ii) Ir, or iii) Rh, or iv) Pd, or v) Re, or vi) Au, or vii) an alloy of Pt, or Ir, or Rh, or Pd, or Re, or Au.

12. The spark plug according to claim 1, wherein the spark plug is a hydrogen spark plug which is configured to be used in an engine operated with hydrogen and to ignite ignitable hydrogen-containing fuel-air mixture.

* * * * *